(12) United States Patent
Fukushi et al.

(10) Patent No.: US 11,760,325 B2
(45) Date of Patent: Sep. 19, 2023

(54) DUMP TRUCK

(71) Applicant: Hitachi Construction Machinery Co., Ltd., Tokyo (JP)

(72) Inventors: Masayuki Fukushi, Ami-machi (JP); Shinjiro Saito, Kasumigaura (JP); Daiki Tetsuka, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 239 days.

(21) Appl. No.: 17/434,788

(22) PCT Filed: Sep. 15, 2020

(86) PCT No.: PCT/JP2020/034911
§ 371 (c)(1),
(2) Date: Aug. 30, 2021

(87) PCT Pub. No.: WO2021/060072
PCT Pub. Date: Apr. 1, 2021

(65) Prior Publication Data
US 2022/0185253 A1  Jun. 16, 2022

(30) Foreign Application Priority Data
Sep. 24, 2019 (JP) ................................ 2019-173442

(51) Int. Cl.
*B60T 13/14* (2006.01)
*B60P 1/04* (2006.01)
*B60T 17/22* (2006.01)

(52) U.S. Cl.
CPC .............. *B60T 13/14* (2013.01); *B60T 17/22* (2013.01); *B60T 2230/00* (2013.01); *B60T 2270/40* (2013.01)

(58) Field of Classification Search
CPC ........ B60T 13/14; B60T 13/686; B60T 17/22; B60T 17/221; B60T 2230/00;
(Continued)

(56) References Cited

U.S. PATENT DOCUMENTS 5,567,021 A * 10/1996 Gaillard ................. B60T 7/042
303/114.1
2003/0217899 A1 * 11/2003 Tanaka ...................... E02F 9/20
188/151 A
(Continued)

FOREIGN PATENT DOCUMENTS

JP  60-143066 U  9/1985
JP  10-24826 A  1/1998
(Continued)

OTHER PUBLICATIONS

International Search Report (PCT/ISA/210) issued in PCT Application No. PCT/JP2020/034911 dated Nov. 10, 2020 with English translation (five (5) pages).
(Continued)

*Primary Examiner* — Nicholas J Lane
*Assistant Examiner* — Stephen M Bowes
(74) *Attorney, Agent, or Firm* — Crowell & Moring LLP

(57) ABSTRACT

Provided is a dump truck capable of performing an actuation test of an emergency brake system at an appropriate timing. The dump truck comprises: front wheel and rear wheel emergency brake systems, each system including an accumulator that accumulates hydraulic oil supplied from a hydraulic pump, a brake device that is actuated by the hydraulic oil supplied from the accumulator, and a solenoid valve that opens and closes a flow path of the hydraulic oil extending from the accumulator to the brake device; and a controller configured to execute front test processing and rear test processing alternately (step S16/step S18) in the
(Continued)

case of determining that the dump truck is stopped (step S11: Yes), a vessel is in a fallen position (step S12: YES), and a loading operation onto the vessel is completed (step S15: Yes/step S17: Yes).

5 Claims, 7 Drawing Sheets

(58) Field of Classification Search
CPC .. B60T 2270/40; B60T 2270/406; B60T 8/18; B60T 8/88; B60P 1/04; E02F 9/2083
See application file for complete search history.

(56) References Cited

U.S. PATENT DOCUMENTS

| | | | |
|---|---|---|---|
| 2009/0112391 A1* | 4/2009 | Uematsu | B60T 10/00 701/31.4 |
| 2011/0270497 A1* | 11/2011 | Uematsu | B60T 8/175 701/50 |
| 2012/0094803 A1* | 4/2012 | Hyodo | E02F 9/2083 477/173 |
| 2014/0374199 A1 | 12/2014 | Minoshima et al. | |
| 2016/0090089 A1* | 3/2016 | Ichinose | B60T 7/18 701/99 |
| 2016/0264032 A1* | 9/2016 | Terada | G07C 5/0808 |
| 2020/0010060 A1 | 1/2020 | Tanaka et al. | |

FOREIGN PATENT DOCUMENTS

| | | |
|---|---|---|
| JP | 2000-219129 A | 8/2000 |
| JP | 2001-260858 A | 9/2001 |
| JP | 2007-69794 A | 3/2007 |
| JP | 5838255 B2 | 1/2016 |
| JP | 2019-26033 A | 2/2019 |

OTHER PUBLICATIONS

Japanese-language Written Opinion (PCT/ISA/237) issued in PCT Application No. PCT/JP2020/034911 dated Nov. 10, 2020 (three (3) pages).

* cited by examiner

DUMP TRUCK

TECHNICAL FIELD

The present invention relates to a dump truck equipped with an emergency brake system.

BACKGROUND ART

An autonomous dump truck is equipped with an emergency brake system that brakes wheels in an emergency. The emergency brake system is configured to, for example, open a solenoid valve to supply a hydraulic brake device with hydraulic oil accumulated in an accumulator.

Since the emergency brake system is used infrequently, there is a possibility that a spool of the solenoid valve gets stuck due to an influence of such as contamination. As a technique for solving such a technical problem, for example, Patent Literature 1 discloses a dump truck in which a parking brake is actuated when a vehicle body is stopped so as to prevent sticking of the solenoid valve.

CITATION LIST

Patent Literature

Patent Literature 1: JP-B-5838255

SUMMARY OF INVENTION

Technical Problem

With this regard, however, when a timing of actuating the emergency brake system and a timing of loading such as earth and sand onto a vessel overlap, the following problems may occur. The first problem is that, if a loading operation is performed in a state where both the front and rear emergency brake systems are actuated, excessive impact is imposed on a vehicle body. The second problem is that, when both the front and rear emergency brake systems are released at the same time, the vehicle body may overrun due to impact and inertial force during the loading operation.

The present invention has been made in view of the circumstances above, and thus an object of the present invention is to provide a dump truck capable of performing an actuation test of an emergency brake system at an appropriate timing.

Solution to Problem

In order to achieve the object above, the present invention provides a dump truck comprising: a vehicle body frame that rotatably supports front wheels and rear wheels through suspensions; a vessel that is supported on the vehicle body frame so as to be able to rise and fall between a rising position and a fallen position; a strut pressure sensor that is configured to detect pressure applied to the suspensions; a hydraulic pump that transfers hydraulic oil; a front wheel emergency brake system and a rear wheel emergency brake system that are configured to brake the front wheels and the rear wheels, respectively; and a controller that is configured to control operations of the front wheel emergency brake system and the rear wheel emergency brake system, wherein the front wheel emergency brake system and the rear wheel emergency brake system include, respectively: a front wheel accumulator and rear wheel accumulator that are configured to accumulate the hydraulic oil supplied from the hydraulic pump; a front wheel brake device and a rear wheel brake device that are configured to be actuated by the hydraulic oil supplied from the front wheel accumulator and the rear wheel accumulator, respectively; and a front wheel solenoid valve and a rear wheel solenoid valve that are configured to open and close a flow path of the hydraulic oil extending from the front wheel accumulator to the front wheel brake device and a flow path of the hydraulic oil extending from the rear wheel accumulator to the rear wheel brake device, respectively, and the controller is configured to: determine whether the dump truck is stopped; determine whether the vessel is in the fallen position; determine whether a loading operation onto the vessel is completed based on the pressure detected by the strut pressure sensor; and in a case of determining that the dump truck is stopped, the vessel is in the fallen position, and the loading operation onto the vessel is completed, execute front test processing and rear test processing alternately, the front test processing being performed to test whether the front wheel emergency brake system normally works by measuring secondary pressure of the front wheel solenoid valve associated with opening and closing operations of the front wheel solenoid valve while the rear test processing being performed to test whether the rear wheel emergency brake system normally works by measuring secondary pressure of the rear wheel solenoid valve associated with opening and closing operations of the rear wheel solenoid valve.

Advantageous Effects of Invention

According to the present invention, it is possible to perform an actuation test of an emergency brake system at an appropriate timing. The problems, configurations, and advantageous effects other than those described above will be clarified by explanation of the embodiment below.

DESCRIPTION OF EMBODIMENTS

Figure 1:
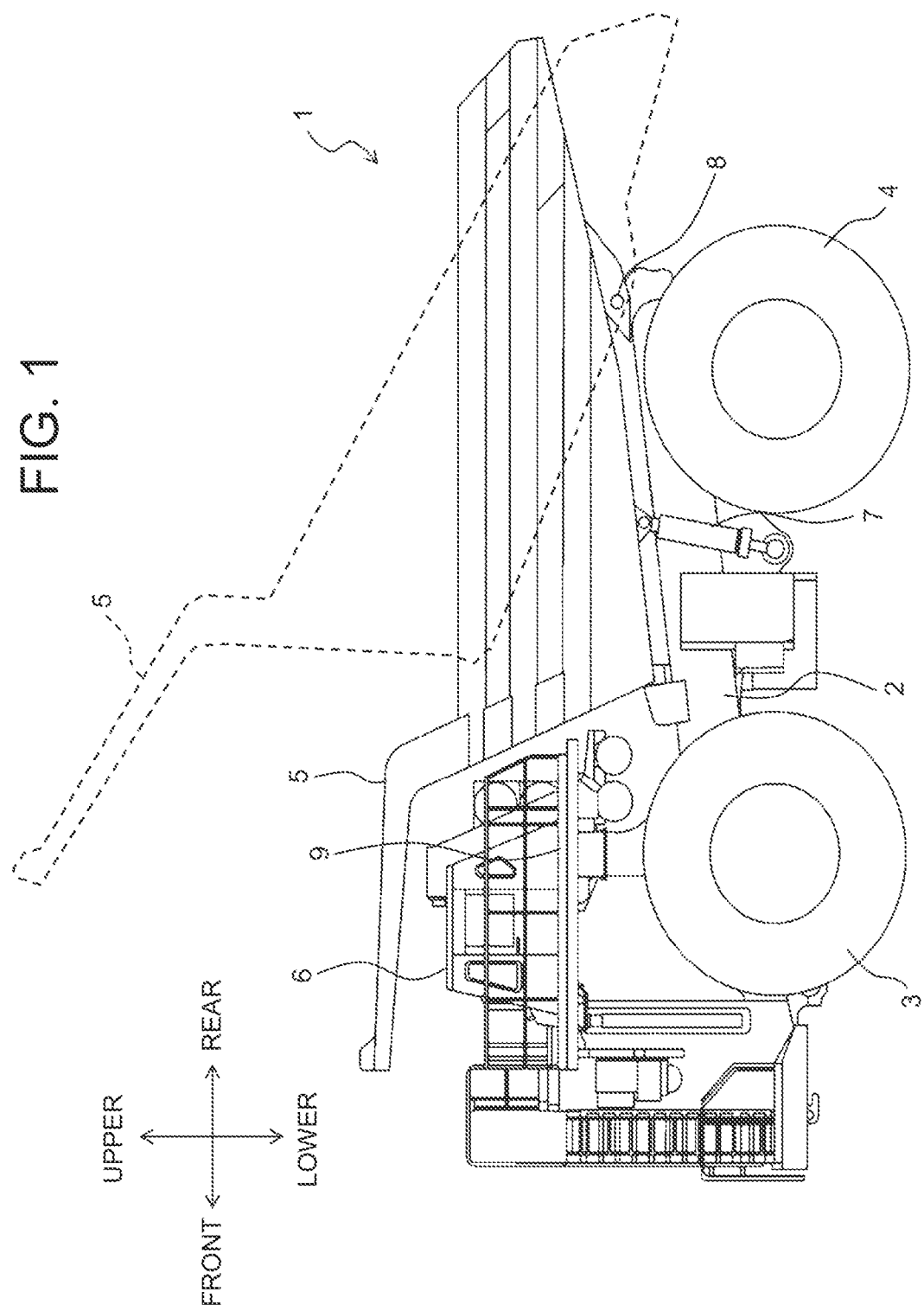
FIG. 1 is a side view of a dump truck according to the present embodiment.

An embodiment of a dump truck according to the present invention will be described with reference to the drawings. FIG. 1 is a side view of a dump truck 1 according to the present embodiment. In this specification, the front, rear, left, and right directions are referred based on a viewpoint of an operator who is in the dump truck 1 to operate the dump truck 1, unless otherwise noted.

As illustrated in FIG. 1, the dump truck 1 according to the present embodiment mainly includes a vehicle body frame 2, a pair of front wheels 3 that is rotatably supported through a suspension 3S at both left and right ends of a front portion of the vehicle body frame 2, a pair of rear wheels 4 that is rotatably supported through a suspension 4S at both left and right ends of a rear portion of the vehicle body frame 2, a vessel 5 that is supported on the vehicle body frame 2 so as to be able to rise and fall, and a cab 6 to be boarded by an operator who operates the dump truck 1.

Each of the pair of front wheels 3 is a steering wheel whose steering angle changes in response to a steering operation. Each of the pair of rear wheels 4 is a drive wheel that is rotated by drive force transmitted from traveling motors 54R, 54L (see FIG. 3). In this connection, the dump truck 1 includes a pair of traveling motors 54R, 54L in order to transmit the drive force independently to each of the pair of rear wheels 4.

The dump truck 1 includes suspension sensors (strut pressure sensors) 51R, 51L, 52R, 52L (see FIG. 3) configured to detect pressure (hereinafter, referred to as "strut pressure") applied to the suspensions 3S, 4S for supporting the pair of front wheels 3 and the pair of rear wheels 4, respectively, and output detection signals indicating detection results to a controller 40 (see FIG. 3). The suspension sensor 51R detects the pressure applied to the suspension of the right front wheel 3, the suspension sensor 51L detects the pressure applied to the suspension of the left front wheel 3, the suspension sensor 52R detects the pressure applied to the suspension of the right rear wheel 4, and the suspension sensor 52L detects the pressure applied to the suspension of the left rear wheel 4.

Figure 3:
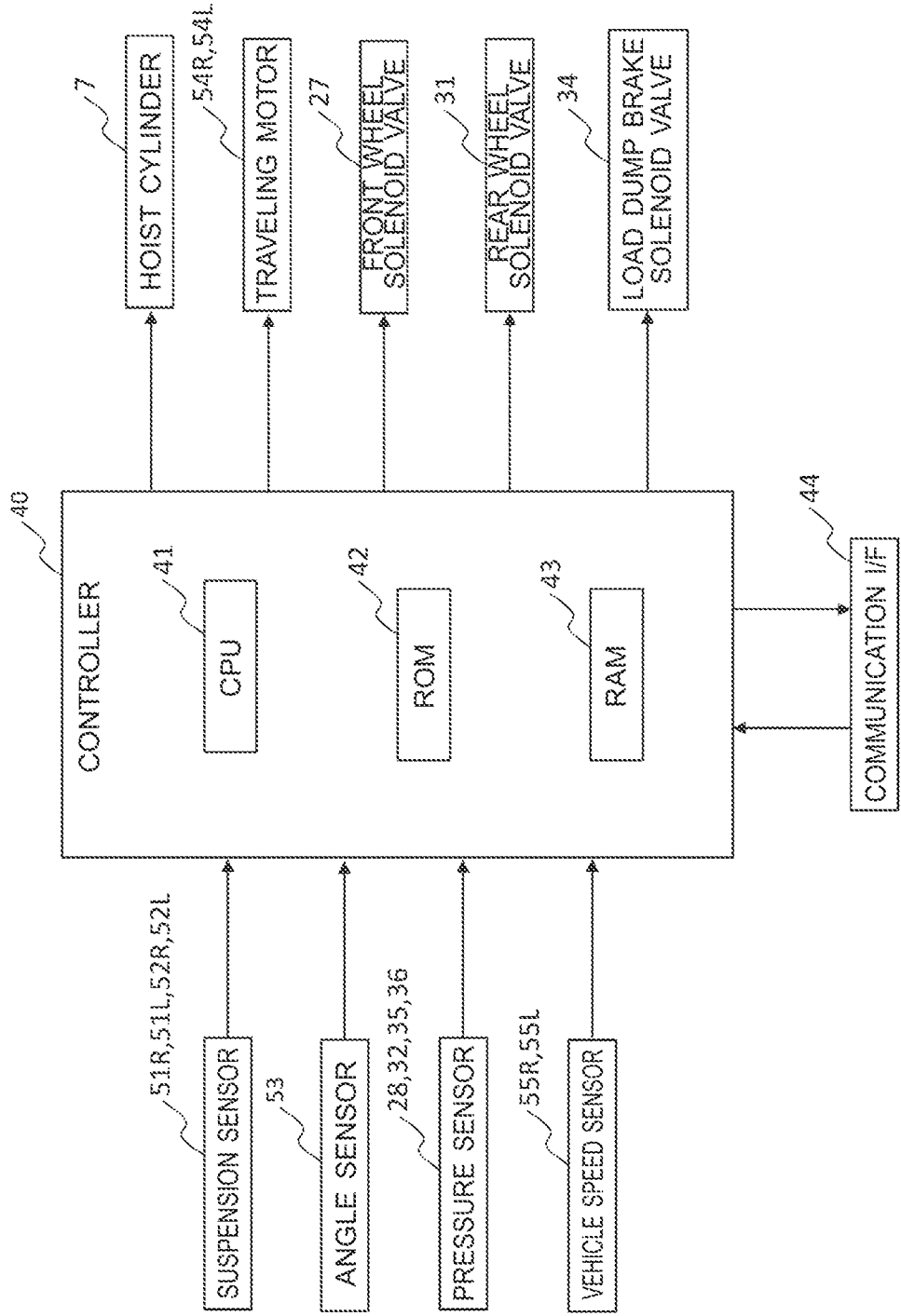
FIG. 3 is a block diagram of a controller equipped on the dump truck.

The traveling motors 54R, 54L are equipped with vehicle speed sensors 55R, 55L (see FIG. 3). Each of the vehicle speed sensors 55R, 55L is configured to detect vehicle speed as traveling speed of the dump truck 1, and output a vehicle speed signal indicating a detection result to the controller 40. More particularly, each of the vehicle speed sensors 55R, 55L may be configured to detect, as the traveling speed of the dump truck 1, rotational speed of the traveling motors 54R, 54L, respectively. As the vehicle speed sensors 55R, 55L, for example, a Hall element that makes use of Hall effect to detect a magnetic field can be employed.

With a hinge pin 8 on the rear portion of the vehicle frame 2 as the center, the vessel 5 rises and falls in the vertical direction by expansion and contraction of a hoist cylinder 7. The hoist cylinder 7, whose one end is connected to the vehicle body frame 2 and the other end is connected to the vessel 5, is supplied with hydraulic oil from a hydraulic pump 11 (see FIG. 2), thereby being expanded and contracted. More specifically, the vessel 5 is configured such that it can rise and fall between a fallen position illustrated by solid lines in FIG. 1 and a rising position illustrated by broken lines in FIG. 1.

The fallen position is a position of the vessel 5 at the time when the hoist cylinder 7 is contracted. In the fallen position, the vessel 5 can be loaded with earth and sand from such as a hydraulic excavator. The rising position is a position of the vessel 5 at the time when the hoist cylinder 7 is expanded. By rotating the vessel 5 from the fallen position to the rising position, the earth and sand loaded onto the vessel 5 is discharged. The dump truck 1 includes an angle sensor 53 configured to detect an angle of the vessel 5 with respect to a reference position (for example, the fallen position), and output a detection signal indicating a detection result to the controller 40 (see FIG. 3).

The cab 6 is arranged on the left end of a deck 9 on the front end of the vehicle frame 2. The cab 6 serves as an operator's cab to be boarded by the operator who operates the dump truck 1. Inside the cab 6, operation devices (accelerator pedal, brake pedal, hoist pedal, steering, lever, switch, etc.) used for operating the dump truck 1 are disposed. The operator in the cab 6 operates the operation devices, whereby the dump truck 1 travels (is accelerated or braked) and the vessel 5 rises.

Figure 2:
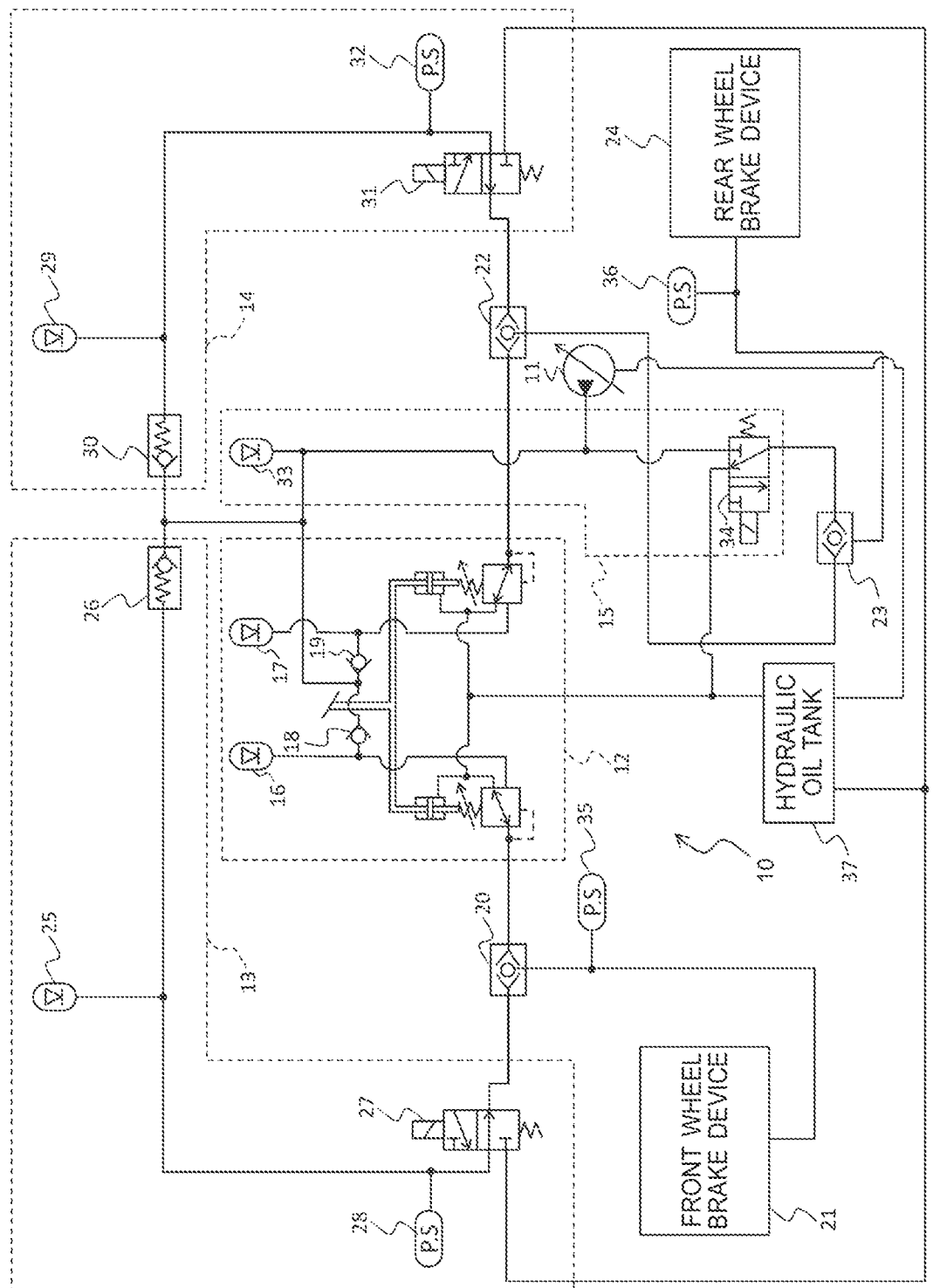
FIG. 2 illustrates a circuit of a hydraulic brake system equipped on the dump truck.

FIG. 2 illustrates a circuit of a hydraulic brake system 10 equipped on the dump truck 1. The hydraulic brake system 10 is configured to brake the front and rear wheels 3, 4 by means of hydraulic oil transferred from the hydraulic pump 11. The hydraulic pump 11 is rotated by drive force transmitted from an engine (not illustrated), thereby transferring the hydraulic oil stored in a hydraulic oil tank 37. The hydraulic brake system 10 mainly includes a foot brake system 12, a front wheel emergency brake system 13, a rear wheel emergency brake system 14, and a load dump brake (auxiliary brake) 15.

The foot brake system 12 is configured to brake the front and rear wheels 3, 4 in accordance with a stepping-on operation of a brake pedal performed by the operator in the cab 6. The foot brake system 12 mainly includes accumulators 16, 17 and check valves 18, 19.

Each of the accumulators 16, 17 accumulates the hydraulic oil supplied from the hydraulic pump 11 through each of the check valves 18, 19. When the operator steps on the brake pedal, a front wheel brake device 21 is supplied with the hydraulic oil accumulated in the accumulator 16 through a shuttle valve 20 while a rear wheel brake device 24 is supplied with the hydraulic oil accumulated in the accumulator 17 through shuttle valves 22, 23.

Each of the front wheel brake device 21 and the rear wheel brake device 24 is supplied with the hydraulic oil, thereby braking the front wheels 3 and rear wheels 4. The braking force from the front wheel brake device 21 and the rear wheel brake device 24 increases as the stepping-on amount of the brake pedal increases. When the operator stops stepping on the brake pedal, the braking of the wheels performed by the front wheel brake device 21 and the rear wheel brake device 24 is released.

The front wheel emergency brake system 13 is configured to brake the front wheels 3 in response to control by the controller 40. The front wheel emergency brake system 13 mainly includes a front wheel accumulator 25, a check valve 26, a front wheel solenoid valve 27, and a pressure sensor 28. The front wheel emergency brake system 13 is a so-called "negative brake", which is configured to release the braking of the front wheels 3 only while the control voltage is applied to the front wheel solenoid valve 27 by the controller 40.

The front wheel accumulator 25 accumulates the hydraulic oil supplied from the hydraulic pump 11 through the check valve 26. The front wheel solenoid valve 27 is configured to open and close a flow path of the hydraulic oil extending from the front wheel accumulator 25 to the front wheel brake device 21 in response to control of the controller 40. The pressure sensor 28 is configured to detect pressure of the hydraulic oil output from the front wheel accumulator 25 (primary pressure of the front wheel solenoid valve 27), and output a detection signal indicating a detection result to the controller 40.

When no control voltage is applied to the front wheel solenoid valve 27 by the controller 40, the front wheel solenoid valve 27 opens the flow path. Thus, the front wheel brake device 21 is supplied with the hydraulic oil from the front wheel accumulator 25 through the shuttle valve 20, whereby the front wheels 3 are braked by the front wheel emergency brake system 13. On the other hand, when the control voltage is applied to the front wheel solenoid valve 27 by the controller 40, the front wheel solenoid valve 27 closes the flow path extending from the front wheel accumulator 25 to the front wheel brake device 21 so as to communicate the front wheel brake device 21 to the hydraulic oil tank 37. Thus, the front wheel brake device 21 is not supplied with the hydraulic oil from the front wheel accumulator 25, and the hydraulic oil is refluxed from the front wheel brake device 21 to the hydraulic oil tank 37. As a result, the braking of the front wheels 3 that has been performed by the front wheel emergency brake system 13 is released.

The rear wheel emergency brake system 14 is configured to brake the rear wheels 4 in response to control by the controller 40. The rear wheel emergency brake system 14 mainly includes a rear wheel accumulator 29, a check valve 30, a rear wheel solenoid valve 31, and a pressure sensor 32. The rear wheel emergency brake system 14 is a so-called "negative brake", which is configured to release the braking of the rear wheels 4 only while the control voltage is applied to the rear wheel solenoid valve 31 by the controller 40.

The rear wheel accumulator 29 accumulates the hydraulic oil supplied from the hydraulic pump 11 through the check valve 30. The rear wheel solenoid valve 31 is configured to open and close a flow path of the hydraulic oil extending from the rear wheel accumulator 29 to the rear wheel brake device 24 in response to control of the controller 40. The pressure sensor 32 is configured to detect pressure of the hydraulic oil output from the rear wheel accumulator 29 (primary pressure of the rear wheel solenoid valve 31), and output a detection signal indicating a detection result to the controller 40.

When no control voltage is applied to the rear wheel solenoid valve 31 by the controller 40, the rear wheel solenoid valve 31 opens the flow path. Thus, the rear wheel brake device 24 is supplied with the hydraulic oil from the rear wheel accumulator 29 through the shuttle valves 22, 23, whereby the rear wheels 4 are braked by the rear wheel emergency brake system 14. On the other hand, when the control voltage is applied to the rear wheel solenoid valve 31 by the controller 40, the rear wheel solenoid valve 31 closes the flow path extending from the rear wheel accumulator 29 to the rear wheel brake device 24 so as to communicate the rear wheel brake device 24 to the hydraulic oil tank 37. Thus, the rear wheel brake device 24 is not supplied with the hydraulic oil from the rear wheel accumulator 29, and the hydraulic oil is refluxed from the rear wheel brake device 24 to the hydraulic oil tank 37. As a result, the braking of the rear wheels 4 that has been performed by the rear wheel emergency brake system 14 is released.

The load dump brake 15 is configured to lock the rear wheels 4 in response to control by the controller 40. The operator operates the load dump brake 15 so as to prevent the vehicle from moving, for example, at the time of loading earth and sand onto the vessel 5 or discharging the earth and sand of the vessel 5. The load dump brake 15 mainly includes an accumulator 33 and a load dump brake solenoid valve 34. The accumulator 33 accumulates the hydraulic oil supplied from the hydraulic pump 11. The load dump brake solenoid valve 34 is configured to open and close a flow path of the hydraulic oil extending from the accumulator 33 to the rear wheel brake device 24 in response to the control by the controller 40.

When the control voltage is applied to the load dump brake solenoid valve 34 by the controller 40, the load dump brake solenoid valve 34 opens the flow path. Thus, the rear wheel brake device 24 is supplied with the hydraulic oil from the accumulator 33 through the shuttle valve 23, whereby the rear wheels 4 are braked by the load dump brake 15. On the other hand, when no control voltage is applied to the load dump brake solenoid valve 34 by the controller 40, the load dump brake solenoid valve 34 closes the flow path extending from the accumulator 33 to the rear wheel brake device 24 so as to communicate the rear wheel brake device 24 to the hydraulic oil tank 37. Thus, the rear wheel brake device 24 is not supplied with the hydraulic oil from the accumulator 33, and the hydraulic oil is refluxed from the rear wheel brake device 24 to the hydraulic oil tank 37. As a result, the braking of the rear wheels 4 that has been performed by the load dump brake 15 is released.

The front wheel brake device 21 is commonly used in the foot brake system 12 and the front wheel emergency brake system 13. The rear wheel brake device 24 is commonly used in the foot brake system 12, the rear wheel emergency brake system 14, and the load dump brake 15. For example, the front wheel brake device 21 is a disc type brake while the rear wheel brake device 24 is a wet type multiplate brake.

The hydraulic brake system 10 further includes a pressure sensor 35 configured to detect pressure of the hydraulic oil supplied to the front wheel brake device 21, and output a detection signal indicating a detection result to the controller 40. The pressure sensor 35 detects the secondary pressure of the front wheel solenoid valve 27 while the front wheel emergency brake system 13 is in operation.

The hydraulic brake system 10 further includes a pressure sensor 36 configured to detect pressure of the hydraulic oil supplied to the rear wheel brake device 24, and output a detection signal indicating a detection result to the controller 40. The pressure sensor 36 detects the secondary pressure of the rear wheel solenoid valve 31 while the rear wheel emergency brake system 14 is in operation. In addition, the pressure sensor 36 detects the secondary pressure of the load dump brake solenoid valve 34 while the load dump brake 15 is in operation.

FIG. 3 is a block diagram of the controller 40 equipped on the dump truck 1. The controller 40 is configured to control the hoist cylinder 7, the traveling motors 54R, 54L, and the solenoid valves 27, 31, 34 based on the detection signals output from the suspension sensors 51R, 51L, 52R, 52L, the angle sensor 53, and the pressure sensors 28, 32, 35, 36, and the vehicle speed signals output from the vehicle speed sensors 55R, 55L. Furthermore, the controller 40 is configured to be communicable with external devices (for example, administration server and hydraulic excavator) through a communication I/F 44.

Each of the traveling motors 54R, 54L drives the pair of left and right rear wheels 4, respectively. More particularly, the traveling motors 54R, 54L are driven and rotated by power generated by a generator (not illustrated) to which the drive force of the engine has transmitted, whereby the dump truck 1 travels (is accelerated).

An operation mode of the controller 40 is switchable between a manual operation mode and an autonomous operation mode. The manual operation mode is used for operating the dump truck 1 in accordance with an operation by the operator in the cab 6. The autonomous operation mode is used for operating the dump truck 1 in accordance with an instruction received from an external device through the communication I/F 44. The manual operation mode and the autonomous operation mode are switched, for example, in accordance with an operation which is input by the operator to an operation device installed in the cab 6.

During the manual operation mode, the controller 40 causes the dump truck 1 to be operated in accordance with the operation input by the operator with respect to the operation device while causing the accumulators 16, 17 to accumulate the hydraulic oil. On the other hand, during the autonomous operation mode, the controller 40 causes the dump truck 1 to be operated in accordance with an instruction received through the communication I/F 44 while causing the accumulators 25, 29, 33 to accumulate the hydraulic oil, respectively.

The instruction received through the communication I/F 44 may be, for example, a traveling instruction for causing the dump truck 1 to travel toward a destination, a loading instruction which actuates the load dump brake 15 when earth and sand is loaded onto the vessel 5 by such as a hydraulic excavator, and a discharging instruction for discharging the earth and sand loaded onto the vessel 5.

Upon receiving the traveling instruction, the controller 40 causes the dump truck 1 to travel toward a destination, and causes the dump truck 1 to stop at the destination. At the time of braking the dump truck 1 at a scheduled timing, the controller 40 actuates the traveling motors 54R, 54L as electric braking. On the other hand, at the time of braking the dump truck 1 in an unexpected event (for example, the case where the dump truck 1 deviates from a predetermined path by a predetermined distance, or the case where a risk of collision is detected), the controller 40 actuates the front wheel emergency brake system 13 and the rear wheel emergency brake system 14.

Upon receiving the loading instruction, the controller 40 executes a brake test, which will be described later with reference to FIG. 4. Upon receiving the discharging instruction, the controller 40 causes the hoist cylinder 7 to expand so that the earth and sand loaded onto the vessel 5 is discharged.

The controller 40 includes a Central Processing Unit (CPU) 41, a Read Only Memory (ROM) 42, and a Random Access Memory (RAM) 43. In the controller 40, the CPU 41 reads a program code stored in the ROM 42 and execute a program, thereby realizing processing which will be described later. The RAM 43 is used as a work area at the time when the CPU 41 executes the program.

Meanwhile, a specific configuration of the controller 40 is not limited thereto, and may be realized by hardware such as Application Specific Integrated Circuit (ASIC) or Field-Programmable Gate Array (FPGA).

Figure 4:
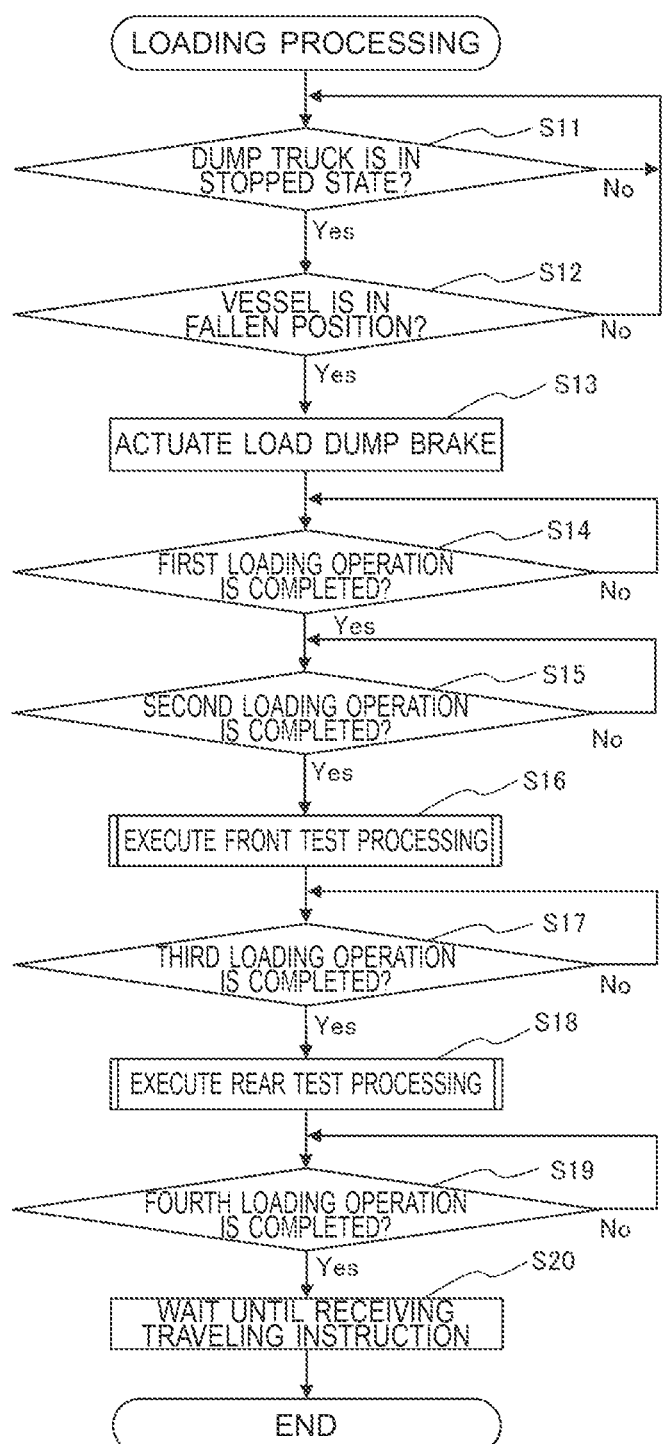
FIG. 4 illustrates a flowchart of loading processing.
Figure 5:
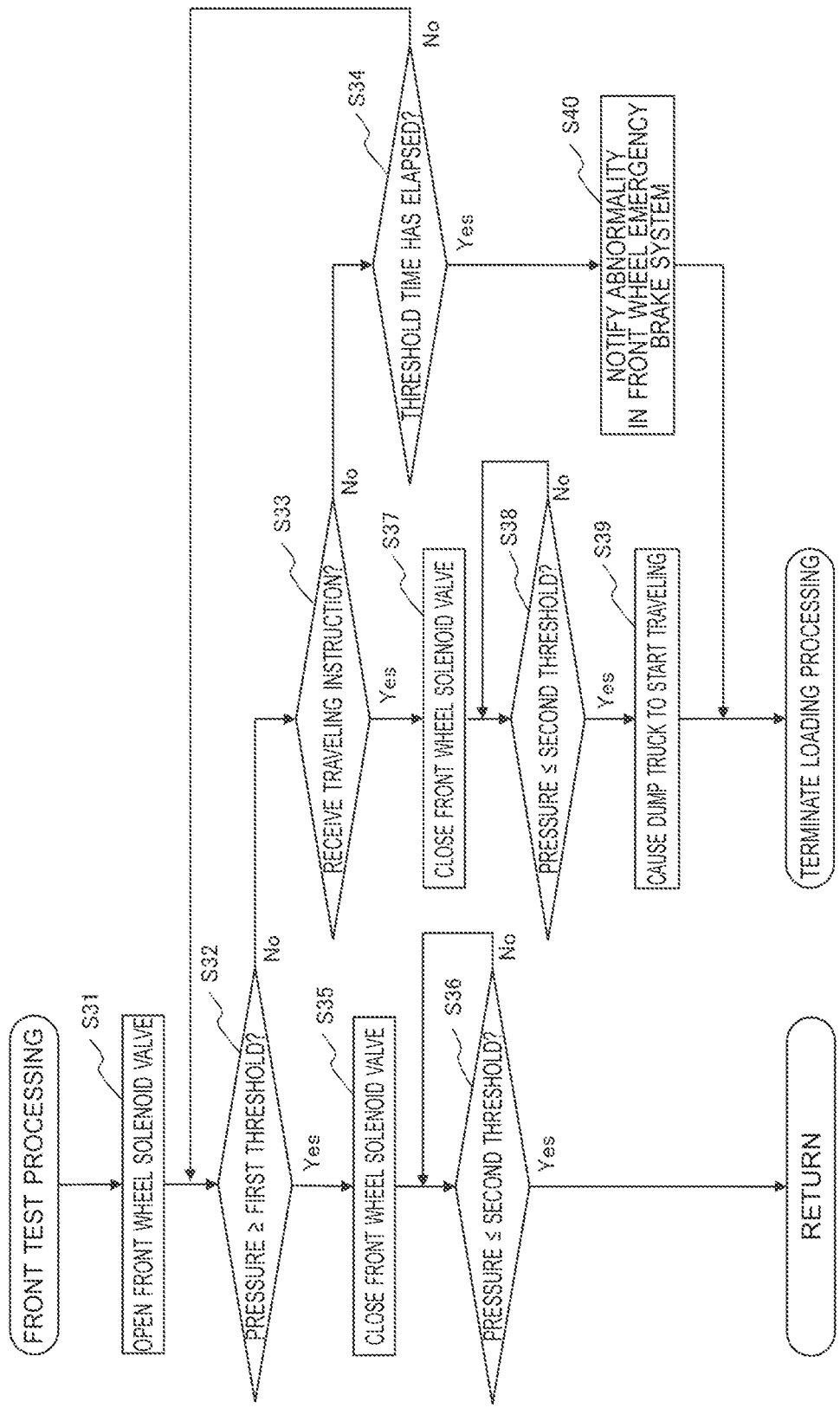
FIG. 5 illustrates a flowchart of front test processing.
Figure 6:
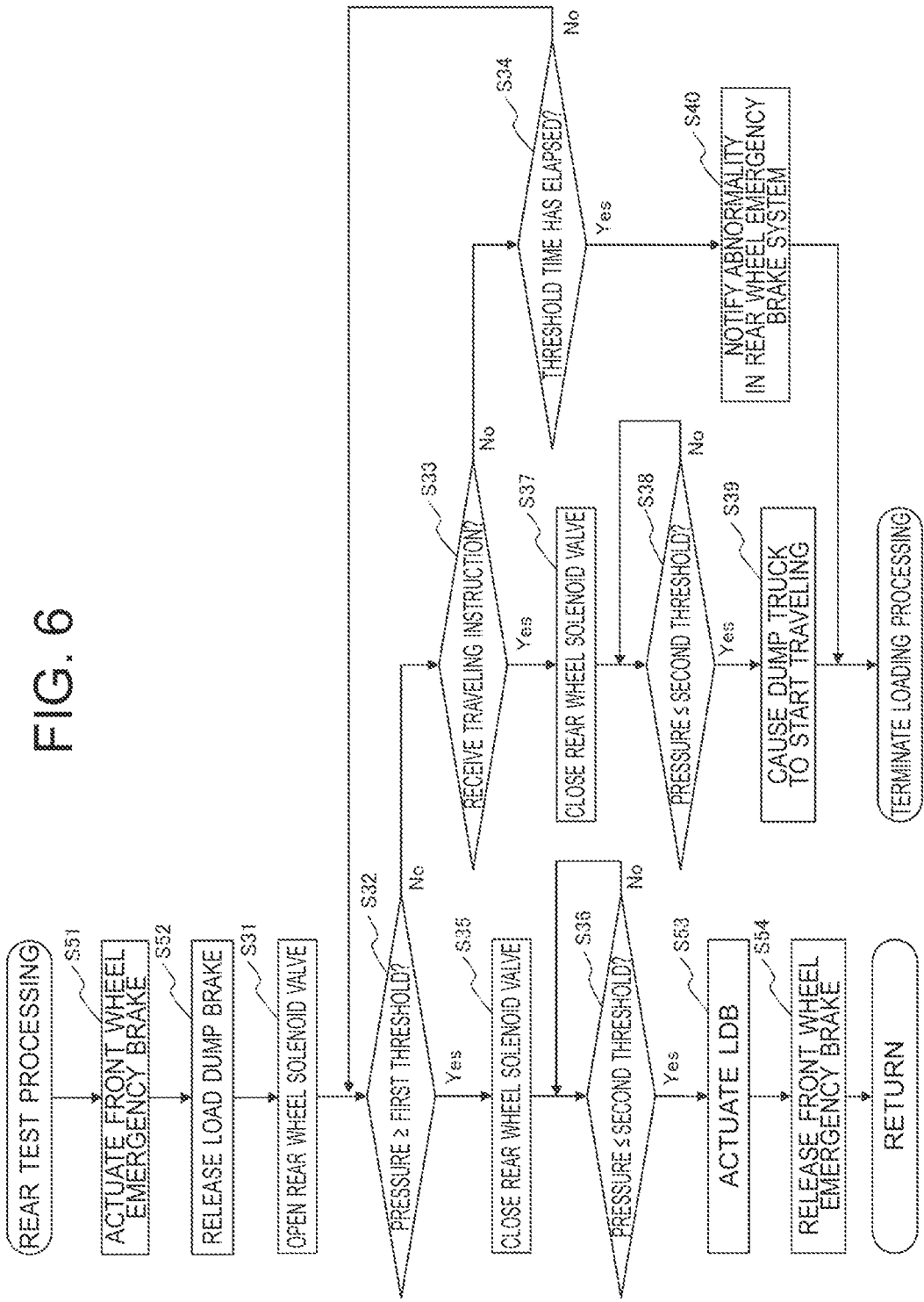
FIG. 6 illustrates a flowchart of rear test processing.
Figure 7:
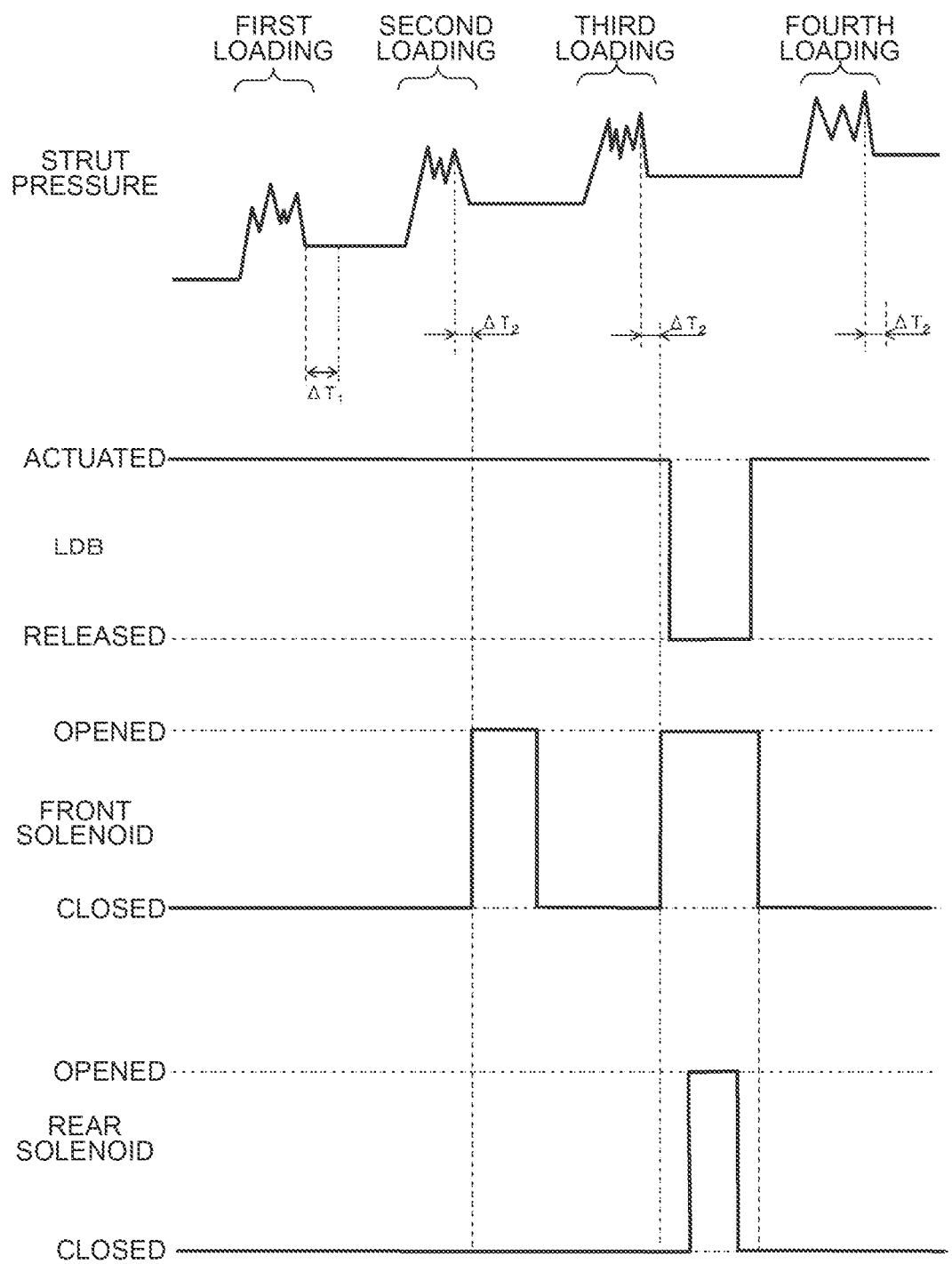
FIG. 7 illustrates transition of strut pressure, a state of a load dump brake, a state of a front solenoid, and a state of a rear solenoid during loading processing.

FIG. 4 illustrates a flowchart of loading processing. FIG. 5 illustrates a flowchart of front test processing. FIG. 6 illustrates a flowchart of rear test processing. FIG. 7 illustrates transition of the strut pressure, a state of the load dump brake 15, a state of the front wheel solenoid valve (front solenoid), and a state of the rear wheel solenoid valve 31 (rear solenoid) during the loading processing.

The loading processing is processing of, for example, loading earth and sand by a hydraulic excavator four times. While an operation of loading the earth and sand is performed by the hydraulic excavator, the controller 40 confirms whether the front wheel emergency brake system 13 and the rear wheel emergency brake system 14 can normally work. The controller 40 makes the loading processing start, for example, at the time when receiving the loading instruction through the communication I/F 44.

Firstly, the controller 40 determines whether the dump truck 1 is stopped based on the vehicle speed signals output from the vehicle speed sensors 55R, 55L (step S11). In addition, the controller 40 determines whether the vessel 5 is in the fallen position based on the detection signals output from the angle sensor 53 (step S12).

Then, in the case of determining that the dump truck is stopped and the vessel 5 is in the fallen position (step S11: Yes and step S12: Yes), the controller 40 actuates the load dump brake 15 (step S13). That is, the controller 40 applies the control voltage to the load dump brake solenoid valve 34, whereby the rear wheels 4 are braked.

Next, the controller 40 delays execution of processes after step S15 until the first operation of loading earth and sand onto the vessel 5 is performed by the hydraulic excavator (step S14: No). The operation of loading earth and sand onto the vessel 5 is detected, for example, based on the detection signals output from the suspension sensors 51R, 51L, 52R, 52L. For example, as illustrated in FIG. 7, the controller 40 determines that the first loading operation is completed in the case where a state in which an amount of change in the strut pressure per unit time (for example, 1 second) is less than $\Delta P$ (for example, 200 [kPa]) continues for a $\Delta T_1$ period (for example, 10 seconds).

In the case of determining that the first loading operation is completed (step S14: Yes), the controller 40 delays processes after step S16 until the second operation of loading earth and sand onto the vessel 5 is performed by the hydraulic excavator (step S15: No). For example, as illustrated in FIG. 7, the controller 40 determines that the second loading operation is completed when a $\Delta T_2$ period has elapsed (for example, 5 seconds) after the amount of change in the strut pressure per unit time (for example, 1 second) exceeds $\Delta P$.

In the case of determining that the second loading operation is completed (step S15: Yes), the controller 40 executes the front test processing illustrated in FIG. 5 (step S16). The front test processing is processing to be performed to test whether the front wheel emergency brake system 13 normally works by measuring the secondary pressure of the front wheel solenoid valve 27 associated with opening and closing operations of the front wheel solenoid valve 27.

Firstly, the controller 40 stops applying the control voltage to the front wheel solenoid valve 27 so as to open the front wheel solenoid valve 27 (step S31). Next, the controller 40 delays subsequent processes until the secondary pressure of the front wheel solenoid valve 27 becomes equal to or more than a first threshold (for example, 18 MPa), the controller 40 receives a traveling instruction through the communication I/F 44, or a threshold time has elapsed after the front wheel solenoid valve 27 is opened (step S32 to step S34).

In the case of determining that the secondary pressure of the front wheel solenoid valve 27 becomes equal to or more than the first threshold based on the detection signal output from the pressure sensor 35 (step S32: Yes), the controller 40 determines that the front wheel solenoid valve 27 is properly opened. Next, the controller 40 applies the control voltage to the front wheel solenoid valve 27 so as to close the front wheel solenoid valve 27 (step S35). In the case of determining that the secondary pressure of the front wheel solenoid valve 27 becomes less than a second threshold (for example, 1.5 MPa) based on the detection signal output from the pressure sensor 35 (step S36: Yes), the controller 40 terminates the front test processing. Then, the controller 40 executes the processes after step S17 illustrated in FIG. 4.

In the case of receiving the traveling instruction before the secondary pressure of the front wheel solenoid valve 27 becomes equal to or more than the first threshold (step S32: No and step S33: Yes), the controller 40 applies the control voltage to the front wheel solenoid valve 27 so as to close the front wheel solenoid valve 27 (step S37). Next, in the case of determining that the secondary pressure of the front wheel solenoid valve 27 becomes less than the second threshold based on the detection signal output from the pressure sensor 35 (step S38: Yes), the controller 40 causes the dump truck 1 to travel in accordance with the received traveling instruction (step S39).

Note that the case where the controller 40 receives the traveling instruction in step S33 corresponds to a case where an instruction for making the dump truck 1 travel is provided before the loading operations of a predetermined number of times (for example, four times) are performed. Accordingly, the controller 40 terminates the loading processing without executing the processes after step S17 illustrated in FIG. 4.

In the case where the threshold time has elapsed before the secondary pressure of the front wheel solenoid valve 27 becomes equal to or more than the first threshold and before the controller 40 receives the traveling instruction (step S32: No, step S33: No, and step S34: Yes), the controller 40 notifies the abnormality in the front wheel emergency brake system 13 (step S40). The abnormality may be notified, for example, to a management server through the communication I/F 44, or by displaying information on a display (not illustrated) installed in the cab 6.

Note that the case where the threshold time has elapsed in step S34 corresponds to a case where, even when the application of the control voltage to the front wheel solenoid valve 27 is stopped, the front wheel solenoid valve 27 cannot open the flow path (that is, the front wheel emergency brake system 13 does not work). Accordingly, the controller 40 terminates the loading processing without executing the processes after step S17 illustrated in FIG. 4.

FIG. 4 is referred herein again. In the case where the front test processing is successfully completed, the controller 40 delays the processes after step S18 until the third operation of loading earth and sand onto the vessel 5 is performed by the hydraulic excavator (step S17: No). The determination criterion of step S17 may be the same as that of step S15.

In the case of determining that the third loading operation is completed (step S17: Yes), the controller 40 executes the rear test processing illustrated in FIG. 6 (step S18). The rear test processing is processing to be performed to test whether the rear wheel emergency brake system 14 normally works by measuring the secondary pressure of the rear wheel solenoid valve 31 associated with opening and closing operations of the rear wheel solenoid valve 31. That is, the controller 40 executes the front test processing and the rear test processing alternately in step S16 and step S18.

Firstly, the controller 40 stops applying the control voltage to the front wheel solenoid valve 27 so as to brake the front wheels 3 (step S51). When the secondary pressure of the front wheel solenoid valve 27 detected by the pressure sensor 35 is the first threshold or more, braking of the front wheels 3 can be confirmed. Next, the controller 40 stops applying the control voltage to the load dump brake solenoid valve 34 so as to release the braking of the rear wheels 4 by the load dump brake 15 (step S52). When the secondary pressure of the load dump brake solenoid valve 34 detected by the pressure sensor 36 is less than the second threshold, the releasing of the braking of the rear wheels 4 can be confirmed.

Then, the controller 40 executes, for the rear wheel emergency brake system 14, the same processes as those in steps S31 to S40 illustrated in FIG. 5. The processes of steps S31 to S40 to be executed in the rear test processing are substantially the same as those described for the front test processing. Hereinafter, only the processes different from those of FIG. 5 will be described.

Firstly, the controller 40 stops applying the control voltage to the rear wheel solenoid valve 31 so as to open the rear wheel solenoid valve 31 in step S31. Furthermore, the controller 40 compares the secondary pressure of the rear wheel solenoid valve 31, which is based on the detection signal output from the pressure sensor 36, to the first threshold or the second threshold in steps S32, S36, and S38. Still further, the controller 40 applies the control voltage to the rear wheel solenoid valve 31 so as to close the rear wheel solenoid valve 31 in steps S35 and S37.

In the case where the processes of steps S31 to S40 in the rear test processing are normally completed (step S36: Yes), the controller 40 applies the control voltage to the load dump brake solenoid valve 34 so as to actuate the load dump brake 15 (step S53). When the secondary pressure of the load dump brake solenoid valve 34 detected by the pressure sensor 36 is the first threshold or more, it can be confirmed that the load dump brake 15 is actuated.

Furthermore, the controller 40 applies the control voltage to the front wheel solenoid valve 27 so as to release the braking of the front wheels 3 by the front wheel emergency brake system 13 (step S54). When the secondary pressure of the front wheel solenoid valve 27 detected by the pressure sensor 35 is less than the second threshold, it can be confirmed that the braking of the front wheels 3 is released. Then, the controller 40 terminates the rear test processing, and executes the processes after step S19 illustrated in FIG. 4.

FIG. 4 is referred herein again. In the case where the rear test processing is successfully completed, the controller 40 determines whether the fourth operation of loading earth and sand on the vessel is completed by the hydraulic excavator 5 (step S19). The determination criterion of step S19 may be the same as that of step S15.

In the case of determining that the fourth operation of loading onto the vessel 5 is completed (step S19: Yes), the controller 40 releases the load dump brake 15 and waits until receiving the traveling instruction (step S20).

According to the embodiment above, for example, the following advantageous effects can be obtained.

According to the embodiment above, in the intervals of the loading operations which are repeatedly performed by the hydraulic excavator, the front test processing (step S16) and the rear test processing (step S18) are executed. Since the operation of loading onto the vessel 5 is not performed in a state where both the front wheels 3 and the rear wheels 4 are braked, it is possible to prevent excessive impact from being imposed on the vehicle frame 2.

Furthermore, according to the embodiment above, the actuation test of the front wheel emergency brake system 13 is performed by opening and closing the front wheel solenoid valve 27 in a state where the load dump brake 15 is actuated. Furthermore, the actuation test of the rear wheel emergency brake system 14 is performed by opening and closing the rear wheel solenoid valve 31 in a state where the front wheel emergency brake system 13 actuated. Since the braking of the front wheels 3 and the rear wheels 4 is not released at the same time, overrunning of the dump truck 1 due to impact and inertial force during the loading can be prevented.

The first loading operation by the hydraulic excavator may be started before the dump truck 1 is completely stopped. In addition, the dump truck 1 may move to the next destination immediately after the fourth loading operation by the hydraulic excavator is completed.

With this regard, in the embodiment described above, among the four loading operations, the front test processing is executed in the interval between the second loading operation and the third loading operation while the rear test processing is executed in the interval of the third loading operation and the fourth loading operation. As a result, the front test processing and the rear test processing can be executed while the vehicle body frame 2 is in a stable state.

Furthermore, in the embodiment above, upon receiving a traveling instruction during execution of the front test processing and the rear test processing (step S33: Yes), that is, while at least either the front wheel solenoid valve 27 or the rear wheel solenoid valve 31 is opened, the controller 40 immediately closes at least either the front wheel solenoid valve 27 or the rear wheel solenoid valve 31 which has been opened (step S37), and terminates the loading processing. As a result, even in the case of receiving the traveling instruction before the loading operations of the specified number of times are completed, the dump truck 1 can smoothly start traveling.

Still further, in the embodiment above, in the case where the secondary pressure does reach the first threshold even when the application of the control voltage to the front wheel solenoid valve 27 and the rear wheel solenoid valve 31 is stopped (step S34: Yes), the controller 40 notifies the abnormality in the front wheel emergency brake system 13 and the rear wheel emergency brake system 14 (step S40), and stops the loading processing. As a result, it is possible to prevent the dump truck 1 from autonomously traveling in a state where the front wheel emergency brake system 13 and the rear wheel emergency brake system 14 do not work normally.

Note that the criterion used to determine completion of the loading operations in steps S14, S15, S17, and S19 is one of the examples, and thus is not limited thereto. In steps S14, S15, S17, and S19, completion of the loading operations may be determined based on the strut pressure detected by a part of the four suspension sensors 51R, 51L, 52R, 52L, or based on an average value of the strut pressure detected by the four suspension sensors 51R, 51L, 52R, 52L. Using the average value enables appropriate determination of completion of the loading operations even in the case where earth and sand is loaded at a position deviated from the center of the vessel 5.

In the embodiment above, an example in which the front wheel emergency brake system 13 and the rear wheel emergency brake system 14 are actuated only during an autonomous traveling mode has been described, meanwhile, an actuation condition of the front wheel emergency brake system 13 and the rear wheel emergency brake system 14 is not limited thereto. For example, the controller 40 may be configured to actuate the front wheel emergency brake system 13 and the rear wheel emergency brake system 14 to assist the foot brake system 12 when detecting a risk of collision during a manual traveling mode.

It should be noted that the embodiment described above is an example which is provided to explain the present invention, and thus the present invention is not limited thereto. A person skilled in the art can make various modifications within the scope of the technical concept of the present invention.

REFERENCE SIGNS LIST

1 dump truck
2 vehicle body frame
3 front wheel
4 rear wheel
5 vessel
6 cab
7 hoist cylinder
8 hinge pin
9 deck
10 hydraulic brake system
11 hydraulic pump
12 foot brake system
13 front wheel emergency brake system
14 rear wheel emergency brake system
15 load dump brake (auxiliary brake)
16, 17, 33 accumulator
25 front wheel accumulator
29 rear wheel accumulator
18, 19, 26, 30 check valve
20, 22, 23 shuttle valve
21 front wheel brake device
24 rear wheel brake device
27 front wheel solenoid valve
31 rear wheel solenoid valve
34 load dump brake solenoid valve
28, 32, 35, 36 pressure sensor
37 hydraulic oil tank
40 controller
41 CPU
42 ROM
43 RAM
44 communication I/F
51R, 51L, 52R, 52L suspension sensor (strut pressure sensor)
56 angle sensor
54R, 54L traveling motor
55R, 55L vehicle speed sensor

The invention claimed is:

1. A dump truck comprising:
a vehicle body frame that rotatably supports front wheels and rear wheels through suspensions;
a vessel that is supported on the vehicle body frame so as to be able to rise and fall between a rising position and a fallen position;
a strut pressure sensor that is configured to detect pressure applied to the suspensions;
a hydraulic pump that transfers hydraulic oil;
a front wheel emergency brake system and a rear wheel emergency brake system that are configured to brake the front wheels and the rear wheels, respectively; and
a controller that is configured to control operations of the front wheel emergency brake system and the rear wheel emergency brake system, wherein
the front wheel emergency brake system and the rear wheel emergency brake system include, respectively: a front wheel accumulator and a rear wheel accumulator that are configured to accumulate the hydraulic oil supplied from the hydraulic pump;
a front wheel brake device and a rear wheel brake device that are configured to be actuated by the hydraulic oil supplied from the front wheel accumulator and the rear wheel accumulator, respectively; and
a front wheel solenoid valve and a rear wheel solenoid valve that are configured to open and close a flow path of the hydraulic oil extending from the front wheel accumulator to the front wheel brake device and a flow path of the hydraulic oil extending from the rear wheel accumulator to the rear wheel brake device, respectively, and
the controller is configured to:
determine whether the dump truck is stopped;
determine whether the vessel is in the fallen position;
determine whether a loading operation onto the vessel is completed based on the pressure detected by the strut pressure sensor; and in a case of determining that the dump truck is stopped, the vessel is in the fallen position, and the loading operation onto the vessel is completed, execute front test processing and rear test processing alternately, the front test processing being performed to test whether the front wheel emergency brake system normally works by measuring secondary pressure of the front wheel solenoid valve associated with opening and closing operations of the front wheel solenoid valve while the rear test processing being performed to test whether the rear wheel emergency brake system normally works by measuring secondary pressure of the rear wheel solenoid valve associated with opening and closing operations of the rear wheel solenoid valve.

2. The dump truck according to claim 1, further comprising an auxiliary brake that brakes the rear wheels by using the hydraulic oil supplied from the hydraulic pump, wherein
the controller is configured to, in a case of determining that the dump truck is stopped, the vessel is in the fallen position, and the loading operation onto the vessel is completed:
execute the front test processing in a state where the auxiliary brake is actuated; and
execute the rear test processing in a state where the auxiliary brake is released and the front wheel emergency brake system is actuated.

3. The dump truck according to claim 1, wherein
the controller is configured to determine that the loading operation onto the vessel is completed in a case where a predetermined time elapses after an average value of the pressure applied to the suspensions of each of a pair of the front wheels and a pair of the rear wheels becomes equal to or more than a threshold.

4. The dump truck according to claim 1, wherein
the controller is configured to execute the front test processing and the rear test processing alternately in a case of determining two or more times that the loading operation onto the vessel is completed after determining that the dump truck is stopped and the vessel is in the fallen position.

5. The dump truck according to claim 1, wherein
the controller is configured to close at least either the front wheel solenoid valve or the rear wheel solenoid valve which has been opened in a case of receiving an instruction for making the dump truck travel while at least either the front wheel solenoid valve or the rear wheel solenoid valve is opened.

\* \* \* \* \*